US009036386B2

(12) United States Patent
Earanky

(10) Patent No.: US 9,036,386 B2
(45) Date of Patent: May 19, 2015

(54) INTERLEAVED TWO-STAGE POWER FACTOR CORRECTION SYSTEM

(71) Applicant: Regal Beloit America, Inc., Beloit, WI (US)

(72) Inventor: Vijay K. Earanky, Troy, OH (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 13/947,669

(22) Filed: Jul. 22, 2013

(65) Prior Publication Data

US 2015/0023077 A1    Jan. 22, 2015

(51) Int. Cl.
*H02M 1/42* (2007.01)
*H02M 3/158* (2006.01)

(52) U.S. Cl.
CPC ............ *H02M 1/4208* (2013.01); *H02M 3/158* (2013.01); *H02M 3/1584* (2013.01)

(58) Field of Classification Search
USPC .............................. 363/65; 323/225, 282–290
See application file for complete search history.

(56) References Cited

U.S. PATENT DOCUMENTS

| | | |
|---|---|---|
| 5,224,025 A | 6/1993 | Divan et al. |
| 5,508,903 A | 4/1996 | Alexndrov |
| 5,793,623 A | 8/1998 | Kawashima et al. |
| 5,929,591 A | 7/1999 | Katou et al. |
| 5,939,837 A | 8/1999 | Canova |
| 7,061,779 B2 | 6/2006 | Yang |
| 7,113,068 B2 | 9/2006 | Chou |
| 7,274,000 B2 | 9/2007 | Dodge et al. |
| 7,290,395 B2 | 11/2007 | Deal |
| 7,403,400 B2 | 7/2008 | Stanley |
| 7,741,750 B1 | 6/2010 | Tang |
| 8,041,524 B2 | 10/2011 | Tan et al. |
| 8,102,165 B2 | 1/2012 | Gu et al. |
| 8,120,457 B2 | 2/2012 | Hu et al. |
| 8,174,855 B2 | 5/2012 | Ribarich et al. |
| 8,305,004 B2 | 11/2012 | Shao |
| 8,363,434 B2 | 1/2013 | Lin |
| 2008/0025052 A1 | 1/2008 | Yasumura |
| 2009/0257257 A1* | 10/2009 | Adragna et al. ............... 363/65 |
| 2011/0242862 A1 | 10/2011 | Westberg |
| 2012/0044729 A1 | 2/2012 | Coleman et al. |

FOREIGN PATENT DOCUMENTS

| | | |
|---|---|---|
| CN | 101217254 | 7/2008 |
| CN | 101325367 | 12/2008 |
| CN | 201571247 | 9/2010 |
| CN | 201741521 | 2/2011 |
| CN | 201789304 | 4/2011 |
| CN | 201937935 | 8/2011 |
| CN | 102215617 | 10/2011 |
| CN | 202002980 | 10/2011 |
| CN | 202435699 | 9/2012 |

(Continued)

*Primary Examiner* — Jessica Han
(74) *Attorney, Agent, or Firm* — Michael Best & Friedrich LLP

(57) ABSTRACT

Methods and systems are described for providing power factor correction for high-power loads using two interleaved power factor correction stages. Each power factor correction stage includes a controllable switch that is operated to control the phasing of each power factor correction stage. The phasing of output current from the second power factor correction stage is shifted 180 degree relative to the output current from the first power factor correction stage.

20 Claims, 4 Drawing Sheets

(56) References Cited

FOREIGN PATENT DOCUMENTS

| | | |
|---|---|---|
| JP | 1998512353 | 11/1998 |
| JP | 2000283784 | 10/2000 |
| JP | 2001508997 | 7/2001 |
| JP | 2007189779 | 7/2007 |
| JP | 2004375746 | 4/2009 |
| JP | 2010220330 | 9/2010 |
| KR | 20100105633 | 6/2009 |
| KR | 20090100584 | 9/2009 |
| KR | 101005557 | 1/2011 |
| RO | 1998110435 | 6/1984 |

* cited by examiner

INTERLEAVED TWO-STAGE POWER FACTOR CORRECTION SYSTEM

BACKGROUND

The present invention relates to systems and methods for power factor correction. The power factor of an AC electrical power system refers to the ratio of the real power to the apparent power in a circuit. A load with a low power factor draws more current than a load with a high power factor for the same amount of useful power transferred to a load. Higher currents increase the energy lost in the power distribution system and require larger wires and other equipment.

SUMMARY

In one embodiment, the invention provides a power factor correction system comprising two interleaved power factor correction stages. The two stages are arranged in parallel with each other and are coupled in series to a rectifier bridge. The rectifier bridge receives an input current from an AC power source and provides a rectified input current to the first power factor correction stage and a second power factor correction stage. The combined output of the two power factor correction stages is provided to a capacitor and a load that are connected to each other in parallel. The first power factor correction stage includes a first controllable switch for controlling the output of the first power factor correction stage. The second power factor correction stage includes a second controllable switch for controlling the output of the second power factor correction stage. A controller is configured to operate the first controllable switch and the second controllable switch such that the output current from the second power factor correction stage is phase shifted relative to the output current from the first power factor correction stage. In some embodiments, the phasing of the second power factor correction stage is shifted 180 degrees relative to the first power factor correction stage.

In another embodiment the invention provides a method of providing power factor correction for high-power systems using a power factor correction system that includes two interleaved power factor correction stages. The first power factor correction stage receives an input current from an AC power supply and provides an output current to a capacitor and a load arranged in parallel relative to each other. Similarly, the second power factor correction stage also receives the input current from an AC power supply and provides an output current that is combined with the output current from the first power factor correction stage. The phasing of the first power factor correction stage and the second power factor correction stage are controlled by operating a first controllable switch and a second controllable switch such that the phasing of the second power factor correction stage is shifted 180° relative to the first power factor correction stage.

Other aspects of the invention will become apparent by consideration of the detailed description and accompanying drawings.

DETAILED DESCRIPTION

Figure 1:
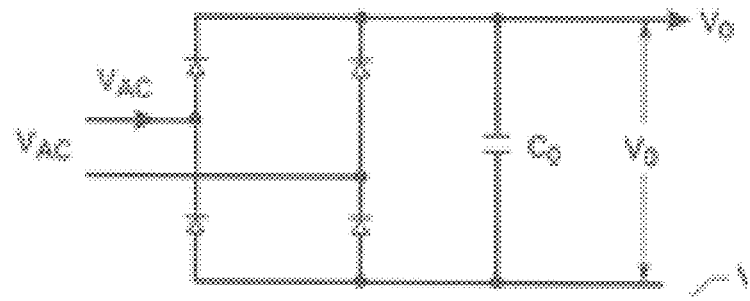
FIG. 1 is a schematic diagram of a rectification circuit.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways.

FIG. 1 illustrates an example of a rectifying circuit that provides ripple current smoothing, but does not include any power factor correction. An AC voltage is supplied to a rectifier bridge including a series of four diodes. The output of rectifier bridge $V_0$ is output to a load. A capacitor $C_0$ is positioned in parallel with the load to provide ripple current smoothing for the rectified current.

Figure 2:
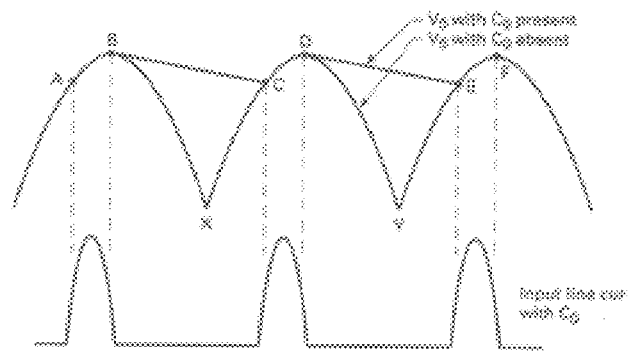
FIG. 2 is a graph of a rectified current waveform with and without ripple current smoothing.

FIG. 2 illustrates the rectified output of the circuit of FIG. 1 both with and without the ripple current smoothing provided by capacitor $C_0$. As shown in FIG. 2, the capacitor $C_o$ smoothes the AC signal such that the voltage at $V_o$ does not drop to the lowest points at troughs X and Y. Instead, the smoothed output signal moves from voltage B to voltage C before rising again to voltage D. Similarly, voltage D drops to voltage E before rising again to voltage F. However, the smoothing of the output affects the current that is drawn from the power source.

As shown in FIG. 2, the input line current spikes between points A and B, between points C and D, and between points E and F as the voltage rises. In some high-power applications, this current spike may be of sufficient magnitude to exceed standard breaker capacity. Furthermore, the rectified and smoothed output of the circuit of FIG. 1 results in notable differences between the real power of the system and the apparent power as calculated based on the voltage output and the current draw. This low power factor results in corresponding power loss and system inefficiencies.

Figure 3:
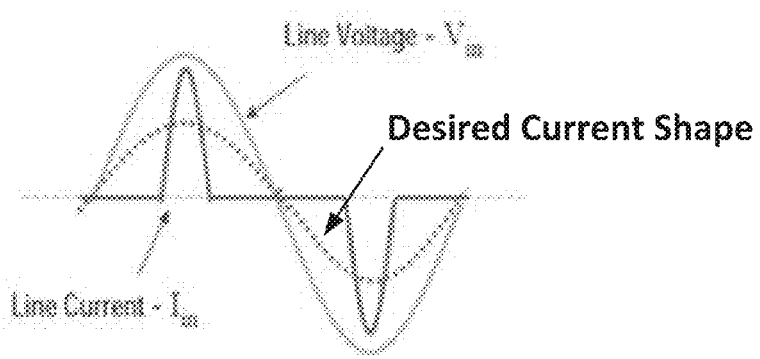
FIG. 3 is a graph of the voltage and current drawn by a load as compared to the desired current draw.

To improve the efficiency of the system and to eliminate current spikes that could exceed breaker capacity, the apparent power of a rectifying circuit would ideally indicate that the system is purely resistive in nature. In other words, the relationship between the current draw and the line voltage would be proportional and in phase as shown by the dotted line waveform in FIG. 3. This adjustment can be achieved or approximated by incorporating power factor correction (PFC) functionality into the rectifier circuit.

Figure 4:
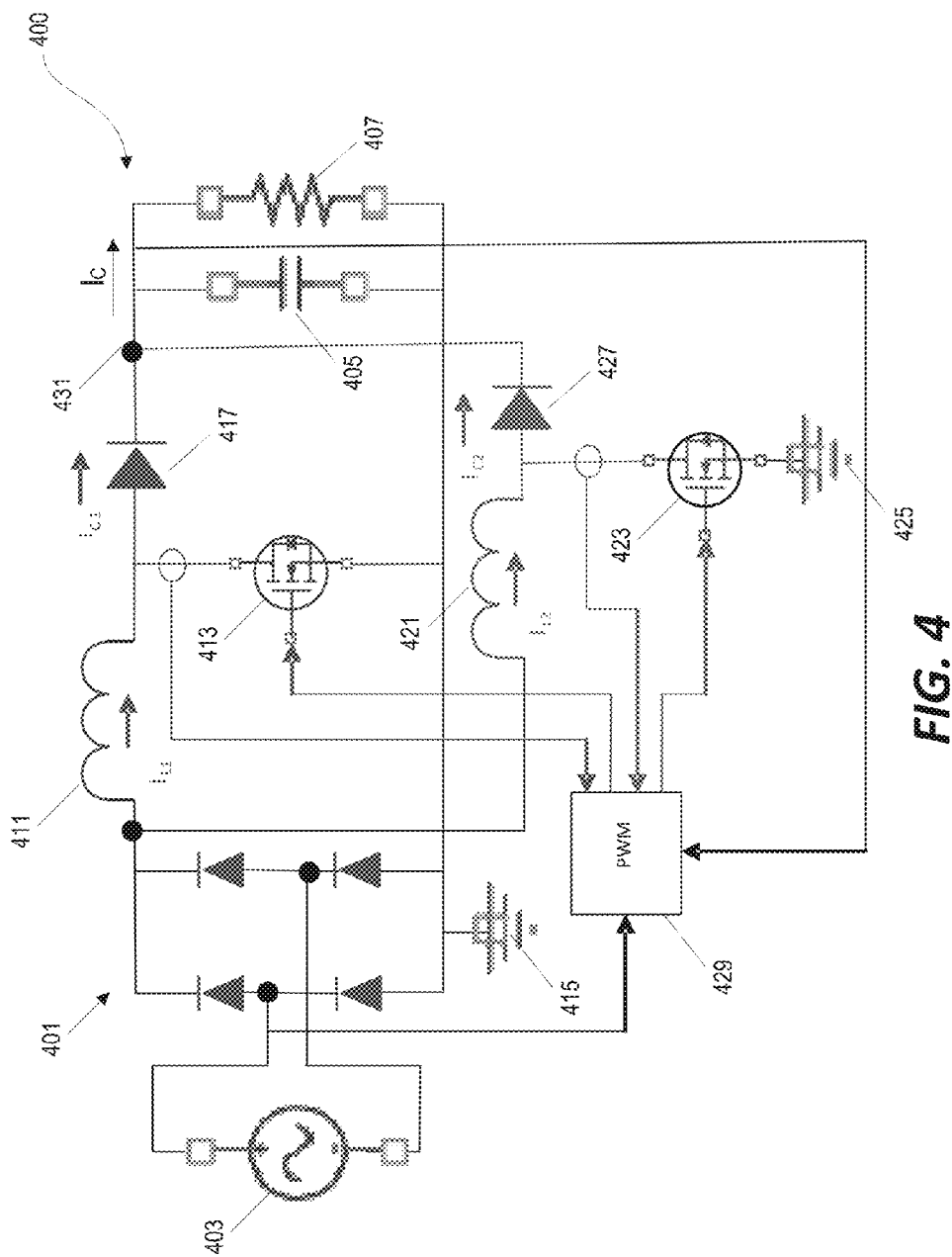
FIG. 4 is a schematic diagram of a power factor correction circuit according to one embodiment.

FIG. 4 illustrates one example of a rectifier circuit 400 that includes a dual-stage, interleaved boost PFC circuit. The bridge rectifier 401 receives current from an AC power source 403. Similar to the circuit of FIG. 1, the rectifier circuit 400 also includes a capacitor 405 that smoothes the ripple current before it is supplied to a load 407. The output of the rectifier bridge 401 is supplied to two interleaved boost PFC circuits. The first boost circuit includes an inductor 411. A controlled switch, such as MOSFET 413, controls whether the output node of the inductor 411 is coupled to ground 415. The inductor 411 charges when the switch 413 is closed and the output node of the inductor 411 is coupled to ground 415.

When the switch 413 is opened, the inductor 411 discharges into the capacitor 405 through diode 417.

Similarly, the second boost circuit receives the output from the rectifier bridge 401 at an inductor 421. A controlled switch, such as MOSFET 423, controls whether the output node of the inductor 421 is coupled to ground 425. The inductor 421 charges when the switch 423 is closed and the output node of the inductor 421 is coupled to ground 425. When the switch 423 is opened, the inductor 421 discharges into the capacitor 405 through diode 427. Diode 427 prevents current output from the first boost circuit stage from flowing back into the second boost circuit stage. Similarly, diode 417 prevents current output from the second boost circuit stage from flowing back into the first boost circuit stage.

A pulse-width modulated (PWM) controller 429 controls the operation of switch 413 and switch 423 such that the gate pulse to the switch 413 of the first boost circuit stage is 180° out of phase with gate pulse of the switch 423 of the second boost circuit. The PWM controller 429 monitors the current input to the circuit ($I_{IN}$) and the voltage output from the system at the capacitor 405 ($I_C$), and manipulates the pulse width such that the input current is sinusoidal and in phase with input voltage. The PWM controller 429 can be implemented by a number of mechanisms including a processor, such as, for example, a microprocessor with executable instructions stored on a memory. Alternatively, the PWM controller 429 can be implemented as an application-specific integrated circuit (ASIC) designed specifically to adjust the output provided to a control terminal of each switch 413, 423 based on the measured current.

Figure 5:
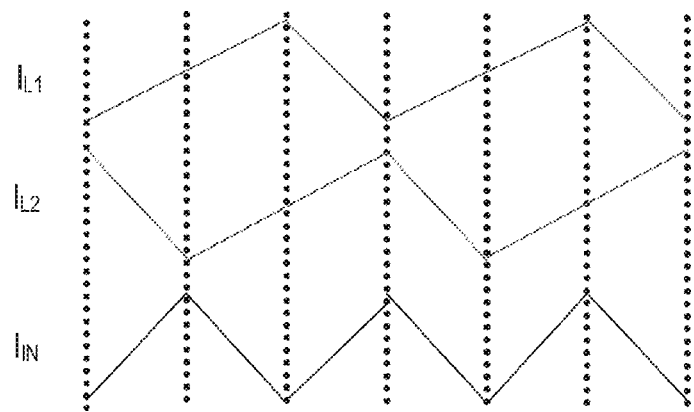
FIG. 5 is a graph of a current provided to the power factor correction circuit of FIG. 4 as compared to currents measured at various nodes of the circuit as a function of time.
Figure 6:
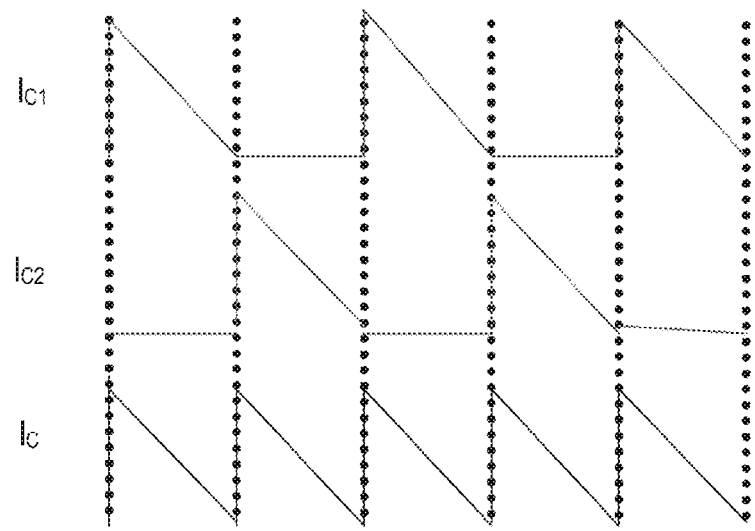
FIG. 6 is a graph of the current output of the power factor correction circuit of FIG. 4 as compared to currents measured at various nodes of the circuit as a function of time.

FIGS. 5 and 6 further demonstrate the functionality of the circuit of FIG. 4 by illustrating a comparison of currents measured at various nodes of the circuit in FIG. 4 as a function of time. As shown in FIG. 5, the input line current $I_{IN}$ is uniformly periodic and the peak value is much lower than the individual phase currents due to phase shifting. The control action of PWM controller 429 (i.e., the controlled switching of MOSFETs 413 and 423), along with inductors 411 and 421, provides power factor correction and smoothes the input current to a sinusoidal waveform shown as the dotted line waveform in FIG. 3).

As described above, PWM controller 429 operates switch 413 and switch 423 in opposite duty cycles. In other words, when switch 413 is opened, switch 423 is closed, and vice versa. As such, the output provided from the first boost circuit stage ($I_{C1}$) and the output provided from the second boost circuit stage ($I_{C2}$) are similarly phase shifted. The output from these two stages, phase shifted 180 degrees, causes the ripple current to cancel when they are added together at node 431 and supplied to the capacitor 405 (as illustrated by $I_c$ in FIG. 6). The ripple current cancellation can save significant system costs as the EMI filter and the output capacitor do not need to attenuate high ripple currents.

There are several advantages to using an interleaved topology as described above in reference to FIG. 4. For example, by utilizing distributed component for high power applications, smaller and more efficient components can be utilized in the system. Furthermore, because the components are distributed, thermal management for heat transfer becomes simplified and more efficient. The circuit can be designed and packaged for an optimum size and efficiency and can be modularized to achieve high power requirements by connecting several modules in parallel.

As discussed above, by phase shifting the control signal by 180 degrees, the input ripple current is reduced significantly allowing smaller filter components for an EMI filter. As a result, $R_{AC}$ and core losses in the boost inductor 411, 421 are reduced allowing for a small core size for the inductors 411, 421.

The control mechanism described above also reduces the output current ripple by half and increases the switching frequency as seen by the output bulk capacitors (e.g., capacitor 405). As such, the size or number of capacitors can be reduced depending upon the physical dimensions of the system.

Furthermore, in order to achieve a high efficiency, the inductors 411, 421 are designed in such a way that efficiency of the drive remains uniform from low power to high power while maintaining almost unity (i.e., constant) power factor. The inductor 411, 421 is able to swing the inductance from a relatively high value (e.g., 900 µH) at low power to a relatively low value (e.g., 300 µH) at high power. In order to obtain such a variation in the inductance, the design of inductor should be carried out with proper selection of core material and the air gap. The permeability of the core material is one parameter that is considered in selecting an appropriate core and a corresponding air gap. This inductor design is optimized to give a desired inductance throughout the operating range. In some constructions, the inductor includes Litz wire to reduce high frequency losses.

Figure 7:
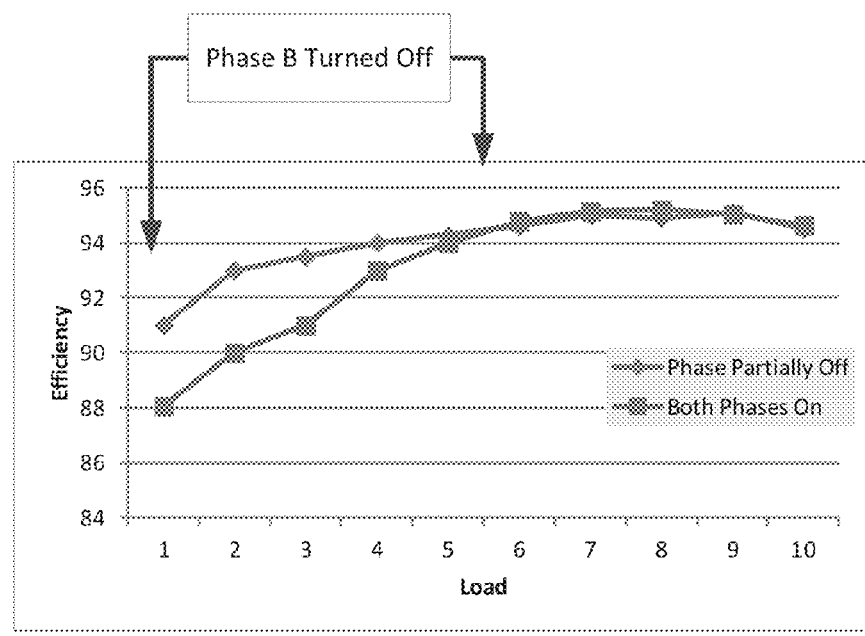
FIG. 7 is a graph of system efficiency as a function of load for a system with a power factor correction circuit of FIG. 4.

In some constructions, the interleaved topology of the power factor correction system is configured to disable one of the stages at light loads to improve overall efficiency from light load to full load. As illustrated in FIG. 7, a single stage is more efficient than a dual stage system at light loads. As such, when the system controller determines that the system is delivering a light load, the controller disables one of the phases by leaving one switch (e.g., switch 413 or switch 423) in the open position. One reasons for the difference in efficiency at light loads illustrated in FIG. 7 is power loss due to the switching action required to operate both switch 413 and switch 423. By leaving one switch (i.e., switch 423) in the open position, the second phase circuit will not operate and power losses due to the switching action of switch 423 are removed.

Thus, the invention provides, among other things, a two-stage, interleaved power factor correction system and methods of operating the same to reduce ripple current. Various features and advantages of the invention are set forth in the following claims.

What is claimed is:

1. A power factor correction system comprising:
   a first power factor correction stage coupleable to an AC power source to receive a current from the AC power source and configured to provide a first output current to a capacitor and a load, the capacitor being coupled in parallel to the load, the first power factor correction stage including a first controllable switch for controlling phasing of the first output current of the first power factor correction stage;
   a second power factor correction stage coupleable to the AC power source to receive the current from the AC power source and configured to provide a second output current to the capacitor and the load such that the second output current from the second stage is combined with the first output current from the first power factor correction stage, the second power factor correction stage including a second controllable switch for controlling phasing of the second output current; and
   a controller configured to
   monitor a combined DC output current from the first power factor correction stage and the second power factor correction stage;

control the operation of the first controllable switch based at least in part on the combined DC output current;

determine, based at least in part on the combined DC output current, whether the load is below a load threshold;

control the operation of the second controllable switch based at least in part on the combined DC output current such that the second output current from the second power factor correction stage is phase shifted relative to the first output current from the first power factor correction stage when the load is above the load threshold; and control the operation of the second controllable switch such that the second controllable switch is maintained in an open position when the load is below the load threshold.

2. The power factor correction system of claim 1, further comprising a rectifier bridge coupled between the first power factor correction stage and the AC power source and between the second power factor correction stage and the AC power source such that the rectifier bridge receives the current from the AC power source and provides a rectified current to the first power factor correction stage and the second power factor correction stage.

3. The power factor correction system of claim 1, wherein the first power factor correction stage further includes a power factor correction boost circuit.

4. The power factor correction system of claim 1, wherein the first power factor correction stage further includes a first inductor, and wherein the first controllable switch is coupled between the output of the first inductor and a ground.

5. The power factor correction system of claim 4, wherein the first power factor correction stage further comprises a diode coupled between the output of the inductor and an output of the first power factor correction stage, and wherein, when the first controllable switch is closed, the diode prevents the second output current from the second power factor correction stage from flowing to the ground through the first controllable switch.

6. The power factor correction system of claim 4, wherein the first inductor is a variable inductor operable to change inductance based on the load.

7. The power factor correction system of claim 1, wherein the first power factor correction stage is connected in parallel with the second power factor correction stage.

8. The power factor correction system of claim 7, further comprising a bridge rectifier connected in series between the AC power source and the parallel arrangement of the first power factor correction stage and the second power factor correction stage.

9. The power factor correction system of claim 1, wherein the controller is further configured to
monitor an AC input current provided to the power factor correction system from the AC power source,
operate the first controllable switch based at least in part on the AC input current and the combined DC output current, and
operate the second controllable switch based at least in part on the AC input current and the combined DC output current when the load is above the load threshold.

10. The power factor correction system of claim 1, wherein the controller includes a pulse-width modulating controller.

11. The power factor correction system of claim 1, wherein the controller is further configured to control the operation of the first controllable switch and the second controllable switch such that the second output current from the second power factor correction stage is phase shifted 180 degrees relative to the first output current from the first power factor correction stage.

12. The power factor correction system of claim 1, wherein the second power factor correction stage is disabled when the second controllable switch is maintained in the open position when the load is below the load threshold.

13. A method of providing power factor correction for high-power systems, the method comprising:
receiving, at a first power factor correction stage, a current from an AC power supply;
providing, from the first power factor correction stage, a first output current to a capacitor and a load, the capacitor being coupled in parallel relative to the load;
receiving, at a second power factor correction stage, the current from the AC power supply;
providing, from the second power factor correction stage, a second output current to the capacitor and the load that is combined with the first output current from the first power factor correction stage to provide a combined DC output current to the capacitor and the load;
receiving, by a controller, a signal indicative of the combined DC output current provided to the capacitor and the load;
controlling phasing of the first power factor correction stage by operating a first controllable switch based at least in part on the signal indicative of the combined DC output current;
determining, based at least in part on the combined DC output current, whether the load is below a load threshold;
controlling phasing of the second power factor correction stage by operating a second controllable switch such that the phasing of the second power factor correction stage is shifted relative to the first power factor correction stage when the load is above the load threshold; and
controlling phasing of the second power factor correction stage by maintaining the second controllable switch in an open position when the load is below the load threshold.

14. The method of claim 13, further comprising receiving the current from the AC power source by a rectifier bridge coupled between the first power factor correction stage and the AC power source and between the second power factor correction stage and the AC power source, and providing a rectified current from the rectifier bridge to the first power factor correction stage and the second power factor correction stage.

15. The method of claim 13, wherein the first power factor correction stage includes a power factor correction boost circuit, and further comprising boosting the current from the AC power source by the first power factor correction stage.

16. The method of claim 13, wherein the first power factor correction stage further includes a first inductor and the first controllable switch is coupled between an output of the first inductor and a ground, the method further comprising routing current from the output of the first inductor to the ground by closing the first controllable switch.

17. The method of claim 16, further comprising preventing the second output current from the second power factor correction stage from flowing to the ground through the first controllable switch when the first controllable switch is closed with a diode coupled between the output of the inductor and an output of the first power factor correction stage.

18. The method of claim 16, wherein the first inductor is a variable inductor operable to change inductance based on the load.

19. The method of claim 13, further comprising:
receiving, by the controller, a signal indicative of an AC input current provided to the power factor correction system; and
wherein controlling the phasing of the first power factor correction stage includes operating the first controllable switch based at least in part on the signal indicative of the AC input current and the signal indicative of the combined DC output current, and
wherein controlling the phasing of the second power factor correction stage includes operating the second controllable switch based at least in part on the signal indicative of the AC input current and the signal indicative of the combined DC output current when the load is above the load threshold.

20. The method of claim 13, wherein the second power factor correction stage is disabled when maintaining the second controllable switch in the open position when the load is below the load threshold.

\* \* \* \* \*